Jan. 29, 1963   R. L. RICHARDSON   3,075,596
TORSION BALANCE
Filed July 21, 1959   3 Sheets-Sheet 1

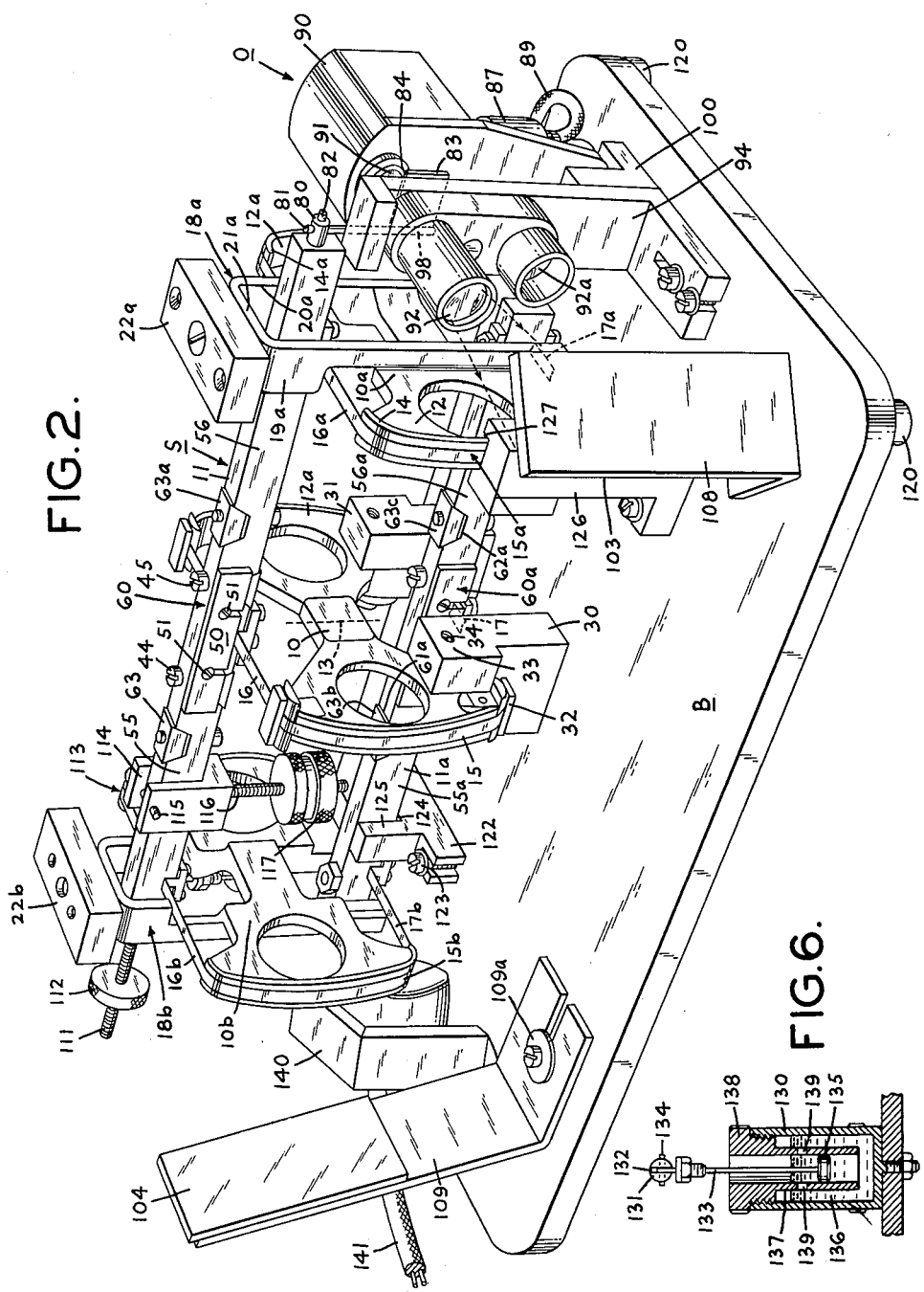

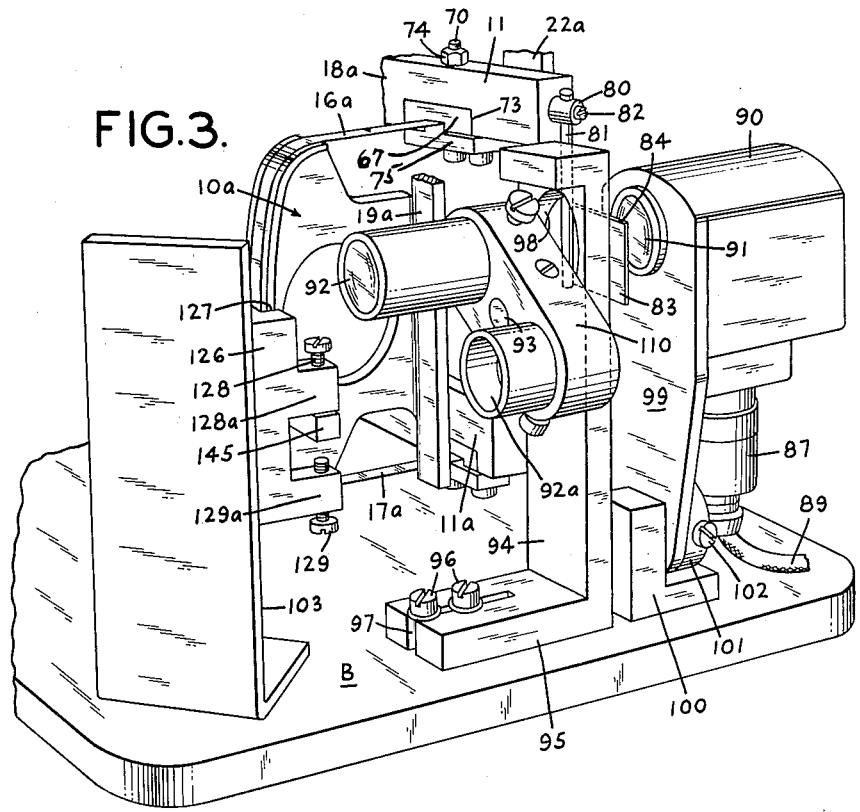

3,075,596
TORSION BALANCE
Robert Lyle Richardson, Glen Rock, N.J., assignor to The Torsion Balance Company, Clifton, N.J., a corporation of New York
Filed July 21, 1959, Ser. No. 828,545
17 Claims. (Cl. 177—172)

This invention relates generally to torsion balances and more particularly to a torsion balance having an optical system for indicating to the viewer the weight of anything placed on the balance to be weighed.

Generally speaking, a balance of the torsion type has always provided some means for the reading or the indication of the condition of the balance; that is to say, the attitude of the beam or condition of equilibrium. The conventional practice has been to indicate the attitude of the beam or condition of equilibrium by means of a pointer attached to a moving part of the balance assembly; the pointer moving with relation to a fixed index or graduated scale which is generally a white background scribed evenly with appropriate divisional black lines.

In accordance with this invention a torsion balance is provided which has an optical assembly which amplifies the movement of the skeleton beam and throws an image upon a screen which carries a graduated index scale thereby to indicate the weight on said scale of the object or thing being weighed on the balance.

In order to provide a torsion balance which will indicate accurately by an optical system, the weight of an object of unknown weight, various adjustments and correcting devices must be provided to prevent errors which would otherwise occur. This invention provides a torsion balance, so devised as to make it possible to indicate the weight of an unknown object with the weight indication being projected as a viewable image onto a frosted glass or translucent screen which carries a suitable index scale.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

FIG. 2 is a view in perspective of the balance shown in FIG. 1, with the housing removed;

FIG. 3 is a view to larger scale of a portion of the balance at the front end showing part of the optical system;

FIG. 4 is a view to larger scale of a portion of the balance at the opposite or rear end showing the dash pot;

FIG. 6 is a view in vertical section of the dash pot;

FIG. 7 is a view in elevation showing the means for clamping the ends of the beams to an end truss band; and FIG. 8 is a bottom view of the clamping means shown in FIG. 7.

Figure 1:
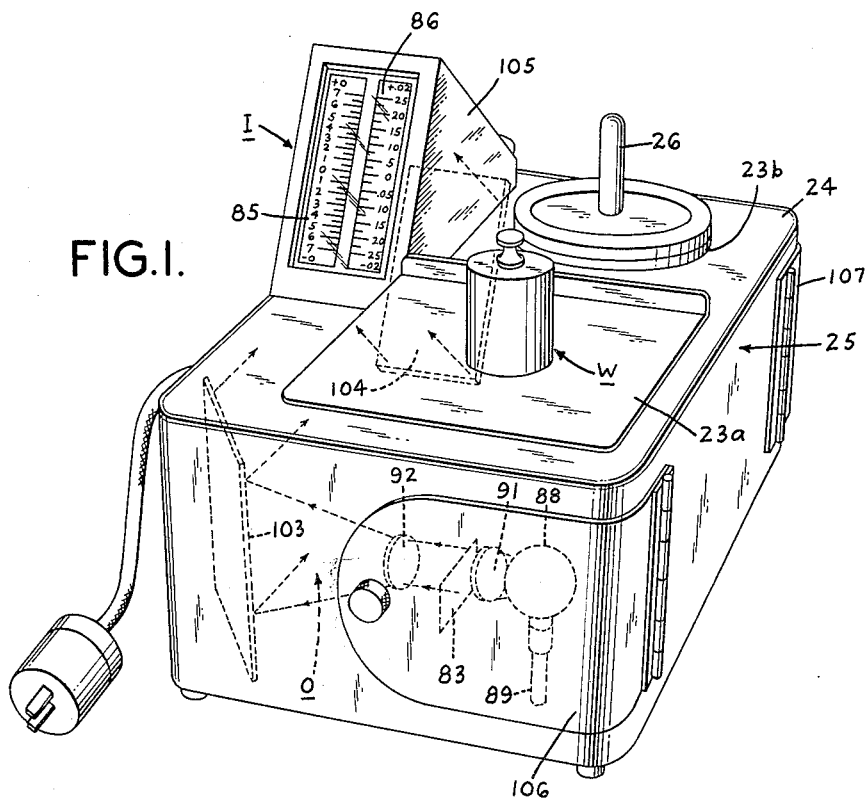
FIG. 1 is a front view in perspective of the balance embodying the invention, with the cover or housing mounted thereon and the weighing pans in use position.

It will be understood that the reference to front, rear and sides of the balance or to left-hand or right-hand parts is for purposes of convenience of description and orientation, and the selection of these is arbitrary as there is no particular significance as to which side is taken as "front" inasmuch as the orientation has nothing to do with the operability of the balance. Referring now to the drawings, in which like reference characters indicate corresponding parts throughout the several views, the balance comprises a base B, a skeleton S and an optical system O for indicating movement of the skeleton for indicating on an index scale I weight W on the balance. The weight W is indicated on index scale I.

The skeleton S comprises a center truss 10 and two end trusses 10a and 10b having attached thereto an upper beam 11 and a lower beam 11a. The two end trusses are alike; but right and left hand to each other. A typical end truss 10a comprises a plate-like member having wings 12, 12a; the wings being symmetrical with reference to a vertical center line. The wings have rim portions 14, 14a. Between the tips of the wings are cut-out portions. A ribbon or band 15 of steel, or other suitable material, under tension extends around the truss thus providing an upper band 16a and a lower band 17a. The other end truss 10b is similarly constructed; having an upper band 16b and a lower band 17b. The end truss 10a has an upwardly extending bracket 18a comprising two vertical legs 19a, 20a joined by a cross piece 21a upon which is removably mounted an adapter block 22a upon which is mounted a weighing pan 23a (see FIG. 1) which is positioned above the top wall 24 of the casing or housing 25 of the weighing balance. The weighing pan is for receiving the unknown weight W which is to be weighed on the balance. The other end truss 10b is similarly constructed as truss 10a and has a bracket 18b and adapter block 22b upon which is mounted and positioned above top wall 24, the weight pan 23b upon which may be removably placed a weight piece 26 of known weight.

The middle truss 10 is constructed much in the same way as the end trusses but it has no upstanding bracket. It has an upper band 16 and a lower band 17. It has symmetrical wings on each side of a center line 13 as do the end trusses. It is fixedly secured to the base B of the balance in vertical position and cross-wise of a plane through the upper and lower beams 11, 11a. The middle truss 10 is mounted at its lower portion to a pair of standards 30, 31 each having a flat horizontal shelf 32 and an upstanding post 33; the truss being secured thereto by means of a screw bolt (not seen) extending through the plate of the truss 10 into a threaded bore 34 in the post. The standards 30, 31 are fixedly secured to the base B.

The upper beam 11 is secured at one end to the upper band 16a of truss 10a; at the other end to the upper band 16b of truss 10b, and intermediate (approximately midway) of its ends to the upper band 16 of middle truss 10. The lower beam 11a is secured to the lower bands 17, 17a, 17b in substantially the same way as upper beam 11 is secured to the upper bands. Particular attention is called to the construction at the middle of beam 11 where it is attached to the upper band 16 of the middle truss 10 (see FIGS. 2, 5). The upper beam 11 has a cut-away portion 35 having upwardly inclined flat surfaces 36, 37. Mounted within this tapered cut-away portion is an elongate wedge-shaped band mounting block 38 which has inclined flat end surfaces 40, 41. This band mounting block 38 is maintained in its place by a pair of clamping wedge blocks 42, 43. It will be noted that the tapered sides of the clamping blocks 42, 43 are complementary to and engage the upward and inwardly tapered surfaces 36, 40 and 37, 41. The length of the elongate wedge 38 and the clamping side wedges combined is longer than the cut-out in the beam and are such that the wedges may be moved vertically within limits. The side wedges 42, 43 are mounted and maintained in their places by means of threaded bolts 44, 45 extending through bores in the beam 11 and registering threaded vertical bores in the wedges 42, 43.

The underside of band clamping wedge 38 is provided with a shallow crosswise groove 46 in which the upper band 16 is positioned; the upper band being clamped in the groove against the wedge member 38 by means of a small clamp plate 47 removably secured to said member 38 in clamping relation by means of screw bolts 48 extending through bores in the flat plate 47 and into registering threaded bores in the wedge 38. The plate 47 has an upwardly extending boss which fits into the groove 46 and engages the band 16 to firmly clamp the band in place. As shown in FIG. 2, but not in FIG. 5, a slotted flat plate 50 removably fastened to the upper beam 11 by screws 51 maintains the wedges 38, 42 and 43 in aligned relation in the cutout portion 35 on the underside of the beam; there being a similar plate on each side of the beam. Also, it may be noted here that at each wing tip of the three trusses, the band on the truss is mounted on a block having a curved surface 52; the band being clamped and held in place by means of a small clamp plate 53, removably fastened by screws 54. As shown in the drawings only the middle truss 10 has these clamps 52, 53 but it will be understood that all of the trusses may be equipped with them, if desired.

Now it will be seen that by adjusting the position of wedges 42 and 43, the position of the band 16 may be shifted, within limits, to the right or left so that the length of the upper beam to the left from the point of attachment at the upper band 16 of the middle truss 10 to the point of attachment at band 16b may be made longer or shorter while the length of the beam on the right-hand side of the middle truss band 16 to the point of attachment at band 16a will be made correspondingly shorter or longer. For example, if the wedge 43 is slightly lowered away from the top of the beam and the wedge 42 is raised correspondingly toward the top of the beam this will shift band clamp wedge 38 to the right with the result that the length of the beam from the band 16 to its left end (that is, the left-end arm of the beam 55) will be lengthened while the length of the beam from the band 16 to its right end (that is, the right-end arm of the beam 56) will be correspondingly shortened. The wedges may be clamped to the upper beam in this position. Hence, the arrangement is such that the upper beam is clamped to the upper band of the intermediate truss 10 by an arrangement whereby the effective length of the left-hand arm 55 may be lengthened or shortened within limits with a corresponding shortening or lengthening of the right-hand arm 56 of the beam 11. This mechanism is indicated generally by reference numeral 60. The lower beam 11a is secured to the lower band 17 of the intermediate truss 10 by a similar arrangement and mechanism 60a, so that the left-hand arm 55a and left-hand arm 56a of the lower beam may be adjusted as to their lengths the same as the upper arms 55 and 56.

Figure 5:
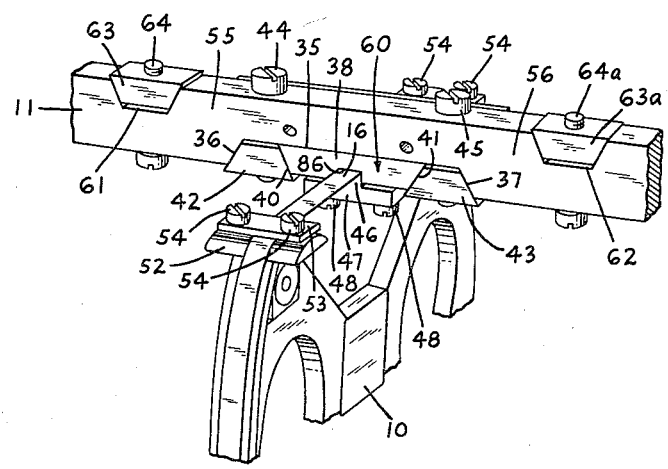
FIG. 5 is a view in perspective of a portion of the upper beam and middle truss, showing the manner of attaching the beam to the upper band of the truss.

Referring now to FIGS. 2 and 5 it will be seen that the upper beam 11, has a tapered cut-out portion 61 in its upper surface intermediate the middle truss band and the left end of the beam and another similar cut-out portion 62 intermediate the middle truss band and the right end of the beam. A wedge-shaped block 63 is mounted in the tapered cut-out 61 for vertical adjustment and is held in adjusted position by a screw bolt 64 extending through a bore in the beam and a registering threaded bore in the wedge block 63. The wedge block 63 is a longer one than the tapered cut-out 61 so that when the wedge 63 in the cut-out is drawn toward the bottom side of the beam 11 by means of screws 64 this will put a certain amount of bow (within limits) in the left-hand arm 55 of beam 11 causing the left end of the left-hand arm to be moved downwardly from its normal position when there is no tension placed on the wedge 63.

A similar wedge 63a in tapered cut-out 62 and a screw 64a provides a similar arrangement on the left-hand arm 56 of beam 11 so that this left-hand arm may be lowered by adjustment of the wedge 63a in cut-out portion 62, to lower the right end of the beam 11 from its normal position. A similar tapered cut-out 61a and wedge 63b is provided in left-hand arm 55a of the lower beam 11a and a similar tapered cutout 62a and wedge 63c provided in right-hand arm 56a of the lower beam 11a provide the same adjustments for bowing the right and left-hand arms of the lower beam, as are provided for the upper beam. The upper beam 11 at its left end, as viewed in FIG. 2 is secured to the upper band 16b of the end truss 10b and, at its right end, is secured to the upper band 16a of the end truss 10a. The lower beam 11a is secured to the lower band 17b of and the right end of this beam is secured to the lower band 17a of the end trusses 10b and 10a respectively. Thus, the end trusses are free to move vertically about the axes provided by the bands of the stationary intermediate or center truss 10.

Inasmuch as each end of each beam is mounted to its adjacent band, in the same way and by the same kind of mechanism, it will suffice to describe only one in detail, since each is the same as the other. The construction is shown perhaps best in FIGS. 3, 7 and 8. It comprises a studded clamp 66 which has a clamp block 67 and groove 68 on the underside to receive the band 16a. This clamp block 67 is shaped to have a band-receiving portion 69, from which upwardly extends a threaded shank 70. The band-receiving portion 69 is of the same width as the underside of the beam and it has curved ends 71, 72. The ends have a radius of curvature to fit into a recess 73 having sides which are curved to complement curved sides 71 and 72. The shank 70 extends through a threaded bore in the beam at the center of the recess 73 and a nut 74 holds it in place. It will be noted that the clamp block 67 may be rotated about the long axis of the shank and it may be clamped in its socket or recess 73 at any desired angular adjustment. The band 16a (see FIG. 3) rests in the groove 68 of the clamp block. A clamp plate 75, removably secured to the clamp block 67 by means of screws 76, maintains the band 16a clamped to the block which in turn is clamped in desired adjusted position on the beam 11. This construction, for clamping the beams to the band of an end truss allows for the truss band to be moved relatively to the beam such as to rotate the vertical center of the end truss around an axis perpendicular to the length of the beam and vertical in direction but does not allow the truss band to have its attaching point moved laterally along the length of the beam. This adjustment permits of aligning the end trusses with the center truss to eliminate errors which might otherwise result from placing a weight on the edge of a pan or away from its effective center in a direction perpendicular to the axis of the beam.

Extending outwardly from the right end of upper beam 11 is a projecting boss 80 having a vertically disposed bore in which is disposed a vertically adjustable staff rod 81 which is maintained in adjusted position by means of a set screw 82. Mounted on the staff 81 in a plane through the plane of beams 11 and 11a is a rigid flat flag member 83 having a straight-edge 84 at its upper side. Now it will be seen that as the skeleton S is rotated about the center truss bands the ends of the beam 11, 11a will be raised or lowered, thus causing the straight edge 84 of flag 23 to move downwardly, for example, when a weight is placed on pan 23a to cause the skeleton S to be rotated in clockwise direction, as viewed in FIG. 2; or, to move upwardly, for example, when a heavier weight is placed on pan 23b (see FIG. 1) to cause the skeleton S to be rotated in counterclockwise direction about the bands of the center truss.

An optical system O is provided to indicate the vertical movement of the flag 83, by means of light rays which are ultimately cast upon a frosted glass or translucent plate 85 having an index scale 86 mounted in the indicating housing I. As will be explained in further detail later on, the image of the flat edge 84 of flag 83 is projected and is caused to move over the scale 86 in response to movement of the skeleton S.

The optical system, most of the parts of which are mounted on the base plate B, comprises a light source and a system of mirrors to reflect the light upon a ground glass or translucent glass screen. A light bulb 88 supplied by current through a connecting electrical conductor cord 89 is mounted on a suitable support 87 on the base B. Preferably, the bulb is shielded in a housing 90 to prevent light from straying in unwanted directions. The light rays from the bulb are focused or concentrated to a small spot by means of a condenser lens assembly 91. This bright light beam passing from lens 91 is interrupted by the flag or vane 83, which as mentioned above, is secured to the upper beam 11 and moves vertically in response to the movement of the beam 11. This interruption produces a black and white image (light and shadow separated by a sharp line produced by straight edge 84 of the flag 83). The black and white image is magnified by the objective lens 92.

It may be noted here that two sets of objective lenses are provided. Lens 92 and lens 92a mounted on a rotating turret 110 which is mounted for rotation about a shaft 93, in turn mounted on a post 94 having a right angle slotted foot 95 adjustably secured to the base B by means of screws 96 extending through the slot 97 into threaded bores in the base. The post 94 has an aperture 98 to permit light to pass from the light source bulb 88 to the objective lens 92. The housing and lens assembly 90 are mounted on a bracket 99 secured to an angle member 100 fixed to the base B; the bracket being rotatably adjustable about a boss 101 which may be clamped by a set screw 102.

The magnified image from lens assembly 92 is reflected to and from a mirror 103 mounted on the base plate B. The image then is reflected from mirror 104 mounted on base B and thence upwardly at an angle on to the ground glass plate 85. The mirrors, as shown in the drawings, are mounted on brackets 108, 109 adjustably mounted on base B by means of slots and screws 109a. The ground glass plate 85 is mounted in a suitable housing 105 which is integral with the casing 25 of the balance. This casing 25 fitting over the skeleton and mounted on the base, has a hinged access door 106 for access to the light source assembly and a hinged access door 107 at the rear end of the housing.

The lens 92 is of greater magnifying power than lens 92a. If it is desired to use lens 92a of smaller magnification, this may be done by rotating the turret 110 to bring lens 92a opposite aperture 98 in the post 94. The motion of the vane 83 in a weighing operation is very small but the resultant projected motion is very large being magnified by the objective lens and further increased as the distance from the objective lens through the reflecting mirrors to the ground glass indicator scale. The provision of two sets of lenses on the turret 110 provides for differences in magnification and hence for two sensitivities. That is, a given small weight placed on the balance pan 23a will produce an optical image deflection of a certain number of units on the graduated index scale 86 using the lower power lens 92a and x times the same number of units using the higher power lens 92. This feature has application particularly in a filling operation in which a container is filled to a given weight by hand. If the material has a granular size which is extremely small, the higher magnifying lens will produce considerably more image deflection on the frosted glass scale 85 for very small additions to the container. If, however, the material is large in granular size and each granule is heavy, the lower power magnification lens reduces the sensitivity of the balance to each granule and therefore gives good weighing or filling accuracy but with a largely expanded weight value on the visible portion of the screen.

The graduated index scale 86 is divided into divisions which are numbered upwardly from each side of a zero division in the center of the scale. Thus the balance will indicate how much over or under an unknown weight W on weighting pan 23a is, when compared with a known weight 26 placed on loose weight pan 23b. For example, if a granular material is being weighed into a container and it is desired to place a given predetermined weight in the container, the amount over or under, as the container is filled, will be indicated on the scale by the amount the image is deflected from the zero division on the index scale 86.

The balance embodies other elements adapted for adjustments or for better operation of the balance. A threaded rod 111 extends outwardly from the left end of beam 11 (see FIGS. 2, 4) upon which is a threaded nut 112. This nut may be moved toward or away from the center truss to decrease or increase the torque tending to rotate the truss about the center bands. This may be used for balancing adjustment to zero on the index scale.

Mounted on the upper beam 11 is a compensating weight assembly 113 comprising a clevis member 114 movable along the beam. This may be clamped at any desired place on the beam by means of a clamping screw 115. Depending from clevis 114 is a threaded rod 116 upon which is mounted a centrally bored and threaded weight 117. This compensating weight assembly provides means which allows for the adjustment of the center of mass of the skeleton assembly S to the center of the upper and lower truss bands. Having the center of mass coincident with the center of the band results in a stable condition of the skeleton with respect to the base when the base is tilted or moved out of the horizontal. This feature is important notwithstanding the fact that the base is provided with vertically adjustable feet for leveling the base: two adjustable feet 120 at each corner on one end and one fixed foot 121 in the middle of the opposite end.

A guide member 122 is mounted and secured by screws 123 on the base B under the lower beam 11a. This guide member has two upstanding vertical guide posts 125; one one each side of beam 11a. This protects the skeleton from accidental over rotation of the lower beam and skeleton assembly around the vertical axis through the center truss 10. There is also provided a vertical guide and stop assembly 126 which is fixed to the base. This stop assembly 126 has a vertical guide groove 127 in which the wing of truss 10a is disposed, but permitting vertical movement of the truss. This vertical guideway 127 prevents undue twisting of the skeleton in the event of rough usage. A similar vertical guide member (not seen in the various views of the drawings) as guide 126 is provided on the opposite side of wing 10a. In addition this assembly 126 contains two vertically adjustable stop members 128, 129 mounted in horizontally disposed spaced arms 128a, 129a and so disposed as to engage a pin 145 fixed to end truss 10a such as to limit vertical motion of end truss 10a, and transmit overloads due to excess weights on weighing pan 23a through the stop members and thence to the base plate.

The balance is also provided with a dash pot 130 mounted on the base. A laterally extending arm 131 secured to truss 10b has a slot 132 within which is pivoted a piston rod 133 by a pin 134. The opposite end of the piston rod mounts a piston 135 which moves up and down in a bath of oil 136 in response to movement of the skeleton about the center bands. The dash pot cylinder 130 is provided with a second cylinder 137 open at both ends and extending downwardly from an apertured closure cap 138. The second cylinder 137 is provided with small bleed openings 139 in its cylindrical wall. Adjustment of damping force is achieved by rotation of inner cylinder 137 which, by virtue of threads in engagement with threads in cylinder 130 at its upper end, is caused to move into and out of cylinder 130. The variation in size of the annular gap formed between the lower ends of cylinders 137 and 130 produces a change in the fluid damping force.

A transformer 140 to reduce the voltage from a 110-volt source through extension cord 141 is mounted on base B. The reduced voltage current then passes through conductor cord 89 to the light bulb 88. If desired the bulb may be lighted by battery and this is preferred if the balance is to be of the so-called portable type which is moved frequently from place to place.

The various adjustments or adjusting mechanisms which are provided are designed to eliminate weighing errors which may be due to manufacturing tolerances in the individual parts or to other factors. In a skeleton of the torsion type in which the load to be weighed is carried by flexible members, such as six truss bands, a small deflection will occur as a load is applied to each pan or platter. Since the vane 83 which produces the image on the optical screen 85, is attached to the upper beam 11 and further since the optical system is rigidly attached to base plate B, an optical deflection will occur when such a sag or deflection of the skeleton assembly occurs under the application of load. This is herein called "load deflection error." In other words, on a skeleton having two pans equally spaced from the center supporting truss band the balance is adjusted to read "0," with no load on the pans. When an equal load is applied to each of the pans, the optical indication should preferably again read "0." But unless a correction is made for it, the deflection caused by weights even though equal on each pan, will cause the image to indicate a deflection from "0." This correction or adjustment to eliminate an error in indication on scale 86 may be made by adjusting the wedges 42, 43 on the upper beam and the corresponding wedges 42a and 43a to change the lengths of the left and right hand arms 55, 56, and 55a, 56a of the beams to change the torque. If a deflection due to weight occurs the vane 83 will drop with respect to the center of the light beam from lens 92. In order to cause the vane 83 to return to the optical center the length or distance of the pan on the end opposite to the vane must be increased by lengthening the effective arm length to produce additional torque and cause a rotation in a direction opposite to and equal in magnitude to the motion produced by the sag or deflection of the skeleton when the load is applied. This arm length adjustment feature allows for this adjustment precisely and without bending of trusses or beams.

Another error called eccentric load error is produced when the mass on the pan is moved from the center of the pan to either extreme position in a direction perpendicular to the axes of the beams, say at the edge of the pan. This error is caused by misalignment of the end trusses with respect to the center truss. That is, the end truss bands are not parallel to the center truss bands and forces are produced when the mass is moved to the extreme edge causing the balance to rotate or deflect and indicate readings other than "0" when such masses are moved. The mechanism of studded clamping block 66 at each end of the upper and lower beams 11, 11a provides an adjustment to align the trusses and bands to eliminate errors. The nut 74 may be loosened, the clamp block 69 rotated so that the end bands are parallel with the center bands and then the nut tightened to clamp the trusses and bands in proper relation to each other.

Also one of the errors in reading resulting from the moving of weights on the weight platter from a central position to the extreme edge of the platter in a direction parallel to the length of the beams may be eliminated by adjustment of wedges 63, 64, 63a, 64a on the beams by turning screws 64, 64a in wedges 63, 64 and the corresponding screws in wedges 63a, 64a. The existence of a so-called natural end load occurs when the points of attachment of the end truss bands to the upper and lower beams do not lie in the same plane as the center truss band; that is, they lie in such a position that tipping loads cause balance deflection. The wedges 63, 64, 63a, 64a may be adjusted to produce deflections in the outermost parts of the upper and lower beams to bring about a sufficient bowing of the beams to correct for the error.

The balance described is a preferred embodiment and may be referred to as an equal-arm two-pan balance. It will be understood that substantially the same balance may be provided having the same accuracy and durability but of a one-pan construction either with equal arms or with unequal arms. This type of balance, of course, relies upon only the internal counterweights to offset the load placed on the weighing platter, therefore it is generally used for checkweighing operations of fixed quantities, the primary interest being the variation in weight from the nominal value. The balance specifically disclosed and described in detail is capable of weighing throughout its capacity range by using loose weights on the second or rear platter. The general construction of the balance is the same for all basic types. However, in the case of the single-pan balance it is not necessary to provide for the arm length adjustment feature described in detail in the foregoing (see particularly FIGS. 2 and 5). The use of unequal arms in a balance of this type is primarily for best performance. The selection of arm length of the weighing platter is made to achieve proper sensitivity, but it can be made to achieve the best physical configuration for the balance.

Likewise the vane which produces the optical image may be placed on either the weighing truss or on the rear or loose weight truss. The optical system may include several mirrors of various sizes and at suitable positions to produce the viewing image in the most appropriate position. The objective lenses are chosen to achieve the most sharply defined image for best and easiest viewing.

The embodiment, as shown in the drawings, is ordinarily termed an end-to-end balance having the weighing platter toward the front and the loose weight platter to the rear, as seen in FIG. 1. This balance may also be visualized as being side-to-side, as in conventional practice, with weighing pan to the left and loose weight platter to the right. The type of image as described is black and white (shadow and light) with the line between as the index line. It is, of course, possible to project a single black line or to project a series of numbers and lines. In all cases the balance as to its general construction is constructed essentially in the same way although the selection of optics, physical arm lengths, position of mirrors, etc. may vary from embodiment to embodiment.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A torsion balance which comprises a base; a skeleton comprising a middle truss fixedly mounted on said base having an upper and a lower band, two end trusses having upper and lower bands, an upper beam and a lower beam; middle truss band mounting means mounting said upper beam intermediate its end to said upper middle truss band at a fulcrum point and middle truss band mounting means mounting said lower beam intermediate its ends to said lower middle truss band at a fulcrum point, said middle truss band mounting means each comprising a band receiving member to receive the band and a removable clamping member clamping the band to said receiving member, said band receiving member being adjustably movable longitudinally on said beams for adjusting the lengths of the lever arms on each side of said middle truss bands for correcting load deflection error, means mounting the ends of said upper beam to said upper end truss bands, means mounting the ends of said lower beam to said lower end truss bands, a vane member secured to said skeleton at one end thereof at a place remote from the middle truss and having an amplitude of movement corresponding to the rotational movement of said skeleton about said fulcrum points, and means for translating the movement of said vane means in magnified form to a visual indicator device for indicating weight, the lengths of said arms on the same side of said middle truss as said vane being adjusted so that their lengths are shorter than the lengths of said arms on the other side of said middle truss, the lengths of said arms on said other side of said middle truss being adjusted so that they are longer than said shorter arms by an amount which produces a torque sufficient to cause a rotation of said beams about their fulcrum points in a direction opposite to and equal in magnitude to the motion produced by the sag of said skeleton when a load to be weighed is applied thereto.

2. A torsion balance constructed according to claim 1 in which the means mounting the ends of the beams to said upper and lower end truss bands each comprises a band receiving member adpustably rotatable on the beam for adjusting each end truss about its vertical central axis for correction of eccentric load error.

3. A torsion balance according to claim 1 in which said means for translating the movement of said vane device comprises an optical system including a light source casting a beam of light in the path of travel of said vane means to form an image, lenses mounted in the path of travel of said light beam to magnify said image, means to reflect and magnify said image further and to cast said magnified image upon an index scale.

4. A torsion balance according to claim 3 in which said vane device is secured to one end of the upper beam and extends in a coaxial direction therefrom.

5. A torsion balance which comprises a base; a skeleton comprising a middle truss fixedly mounted on said base having an upper and a lower band, two end trusses having upper and lower bands, an upper beam and a lower beam, means mounting said upper beam intermediate its ends to said upper middle truss band at a fulcrum point and means mounting said lower beam intermediate its ends to said lower middle truss band at a fulcrum point, means mounting the ends of said upper beam to said upper end truss bands, means mounting the ends of said lower beam to said lower end truss bands, and an adjustable means secured to each of said beams adjacent said middle truss and to each of said fulcrum bands and movable longitudinally along said beams providing an adjustment to change the effective lengths of the arms of said beams on both sides of said fulcrum points, for compensating for load deflection error in said balance; means secured by threaded fasteners to said beams for adjustably bowing the right and left hand lever arms of said upper and lower skeleton beams and indicating means operative to indicate rotational movement of said beams about their fulcrum points in terms of weight.

6. A torsion balance constructed according to claim 5 in which said indicating means comprises an optical system including vane means secured to said skeleton, a light source casting a beam, said vane moving in response to movement of said skeleton to cast an image in response to movement of said vane and an index upon which said image is cast.

7. A torsion balance constructed according to claim 5 in which said arm length adjusting means comprises wedge-shaped blocks adjustably secured to the lower beam intermediate its ends adjacent said middle truss and wedge-shaped blocks adjustably secured to the upper beam intermediate its ends adjacent said middle truss and means to adjustably move said blocks toward and away from said beams and clamp them whereby to shift said fulcrum points selectively in either direction along the long axes of said beams.

8. A torsion balance constructed according to claim 7 in which said indicating means comprises a light source, a condenser lens through which the light beam passes, a vane attached to said skeleton and movable across said light beam in response to movement of said skeleton, a plurality of sets of objective lenses of different magnifying power, turret means mounting said sets of objective lenses operative selectively to place any one of said sets in the path of said light beam through which the image of said movable vane passes, and an index scale upon which said image is cast.

9. A torsion balance constructed according to claim 5 in which an adjustable weight-compensating assembly is secured to one of said beams which is movable to shift the center of gravity of said skeleton.

10. A torsion balance constructed according to claim 9 in which said weight-compensating assembly comprises a clevis slidably mounted on said upper beam, a threaded shank depending from said clevis and a weight having an internally threaded bore mounted on said threaded shank.

11. A torsion balance constructed according to claim 5 in which said adjustable beam bowing means comprises a tapered cut-out portion in each of said arms, a tapered wedge in each of said cut-out portions and screw means in each of said wedges operative to move said wedges toward and away from said beams.

12. A torsion balance constructed according to claim 5 in which a guide and stop means is mounted on said base to prevent twisting of said skeleton about a vertical axis through said middle truss and to limit rotational movement of said truss about said fulcrum points.

13. A torsion balance constructed according to claim 5 which includes a post mounted on said base having a vertical guideway in which the outer portion of the wings of one of said end trusses is vertically movable, said guideway preventing twisting of said skeleton about a vertical axis through the center of said middle truss and adjustable stop means limiting the range of rotational movement of said skeleton about said fulcrum points.

14. A torsion balance constructed according to claim 5 which includes adjustable means at each end of said beams mounting the ends of said beams to said upper and lower end truss bands, said adjustable mounting means being adjustable to align said end trusses to lie in planes parallel to the plane of said middle truss.

15. A torsion balance constructed according to claim 5 which includes adjustable band clamping means mounted on each end of said upper and lower beams for rotatable movement within limits about a vertical axis, said upper and lower end bands being clamped therein, said rotatable clamping means providing an adjustment to align the three trusses so that the end trusses lie in planes parallel with the plane of said middle truss.

16. A torsion balance constructed according to claim 11 including an arm secured to one of said end trusses, a dash-pot cylinder mounted on said base, a piston vertically movable in a liquid bath in said cylinder, and a piston rod connected at one end to said piston and pivoted at its other end to said arm and vertically movable in response to rotation of said skeleton about said fulcrum points.

17. A torsion balance constructed according to claim 16 including a standard mounted on said base having a stop member positioned beneath one of the arms of said lower beams to limit the distance of downward movement of said arm when a weight in excess of the capacity of said balance is placed on said skeleton.

References Cited in the file of this patent

UNITED STATES PATENTS

| | | |
|---|---|---|
| 340,007 | Roeder | Apr. 13, 1886 |
| 1,169,929 | Conway | Feb. 1, 1916 |
| 1,484,358 | Norton | Feb. 19, 1924 |
| 2,082,968 | Morris | June 8, 1937 |
| 2,191,635 | Battenberg | Feb. 27, 1940 |
| 2,570,621 | Williams | Oct. 9, 1951 |
| 2,729,438 | Wasko | Jan. 3, 1956 |
| 2,731,880 | Beeson | Jan. 24, 1956 |